United States Patent [19]

Chinoporos et al.

[11] Patent Number: 4,656,117

[45] Date of Patent: * Apr. 7, 1987

[54] AZO AND AZOMETHINE DYE DEVELOPERS

[75] Inventors: Efthimios Chinoporos, Belmont; Elbert M. Idelson, West Newton; Patrick F. King, Needham, all of Mass.

[73] Assignee: Polaroid Corporation, Cambridge, Mass.

[*] Notice: The portion of the term of this patent subsequent to May 12, 1998 has been disclaimed.

[21] Appl. No.: 374,277

[22] Filed: May 3, 1982

[51] Int. Cl.$^4$ .................. G03C 1/40; G03C 5/54; G03C 7/26

[52] U.S. Cl. .................. 430/225; 430/224; 430/559; 430/562; 430/563

[58] Field of Search ............... 430/224, 225, 559, 562, 430/563

[56] References Cited

U.S. PATENT DOCUMENTS

| | | | |
|---|---|---|---|
| 4,174,221 | 11/1979 | Idelson | 430/225 |
| 4,267,252 | 5/1981 | Idelson | 430/225 |
| 4,267,253 | 5/1981 | Idelson | 430/225 |

*Primary Examiner*—Richard L. Schilling
*Attorney, Agent, or Firm*—Gaetano D. Maccarone

[57] ABSTRACT

There are described novel azo and azomethine dye developers which include a pyrazolone moiety having two silver halide developing groups. In one embodiment the dye developers are metal complexed. The dye developer compounds are useful in photographic products and processes.

10 Claims, No Drawings

AZO AND AZOMETHINE DYE DEVELOPERS

BACKGROUND OF THE INVENTION

The invention relates generally to novel compounds and more particularly to dye developer compounds which are useful in photographic applications.

Dye developer compounds are well known in the photographic art. Dye developers, as noted in U.S. Pat. No. 2,983,606, are compounds which contain, in the same molecule, both the chromophoric system of a dye and also a silver halide developing function, i.e., a grouping adapted to develop exposed silver halide. Metal-complexed dye developers constitute a preferred class of compounds. These metal-complexed compounds include 1:1 complexes, a term embracing complexes of one dye molecule complexed to a metal ion, and 2:1 complexes, a term embracing complexes of two dye molecules complexed to a metal ion.

Magenta 1:1 chrome-complexed dye developers which include a colorless ligand which is a radical of an iminodiacetic acid are disclosed in U.S. Pat. Nos. 4,267,252 and 4,267,253.

SUMMARY OF THE INVENTION

It is the object of this invention to provide novel dye developer compounds.

It is another object of the invention to provide novel metal complexed dye developer compounds.

It is a further object of the invention to provide dye developer compounds which include a pyrazolone moiety having two silver halide developing groups.

Still another object is to provide 1:1 metal-complexed dye developers.

Yet another object is to provide 2:1 metal-complexed dye developers.

A further object is to provide photographic products and processes utilizing the novel dye developers.

BRIEF SUMMARY OF THE INVENTION

These and other objects and advantages are accomplished in accordance with the invention by providing novel dye developer compounds represented by the formula

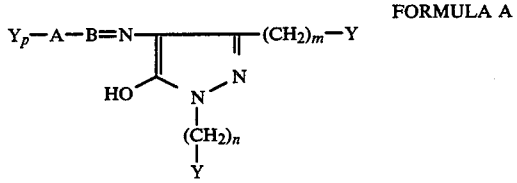

FORMULA A wherein A is an aromatic radical such as a radical of benzene or naphthalene; B is —N— or —CH; Y is a silver halide developing substituent; m and n are the same or different and each is an integer of from 1 to 6; and p is 0, 1 or 2.

The metal-complexed dye developer compounds of the invention are represented by the formula

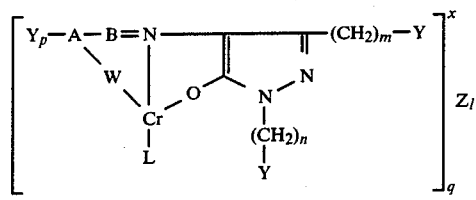

FORMULA B wherein A is as described above; W is —O— or —COO; L is a molecule or molecules that can satisfy the coordination sphere of chromium which is six coordinate; x is a positive or negative charge or zero depending upon L; Z is a counterion and can be a cation or an anion; q is equal to the absolute value of the charge on the counterion, Z, for example, where Z is $Ca^{+2}$ then q is 2, etc.; and l is 0 or 1 depending upon whether x is 0 or a positive or negative charge.

As noted above, L can be a molecule or molecules which can satisfy the coordination sphere of chromium. Trivalent chromium is six coordinate. The coordinate bonds are fulfilled by bondage to the oxygen atom of the pyrazolone moiety, to a nitrogen atom, to W and to the molecule or molecules represented by L. Typical suitable molecules which can be represented by L include $H_2O$, $(CH_3)_2NCHO$, Cl, a ligand such as any of the many ligands known for metal complexed dye developers; or a dye moiety so as to provide a 2:1 chrome complexed dye developer.

The counterion, Z, when present, is a photographically acceptable counterion and may be any which will not impair photographic processing, i.e., impair the absorption characteristics of the dye moiety (ies) or impair the functionality of the chrome complex as a dye developer or otherwise impair the formation of an image. The counterion may be a metal ion such as lithium, sodium or calcium; a halogen ion such as chloride; $H_3O^+$, or an onium ion such as an ammonium, phosphonium or sulfonium ion. Typical suitable onium ions include the ammonium ion, or quaternary ions of organic bases, e.g., pyridinium, picolinium, anilinium and tri-n-butylammonium, etc.

In the compounds of the invention the silver halide developing group, Y, is a group containing a benzene or naphthalene nucleus containing at least a hydroxy and/or amino substituent ortho or para to another such substituent. Silver halide developing groups of this type are well known in the art as evidenced, for example, by Neblette's Handbook of Photography, 7th Edition, Van Nostrand Reinhold Company, Inc., (1977), pp. 115–118. A preferred class of developing groups is the hydroquinonyls including substituted derivatives such as alkyl, phenyl and/or alkoxy substituted derivatives of hydroquinone.

Two types of 1:1 chrome complexed dye developers according to the invention are represented by Formulas C and D.

FORMULA C

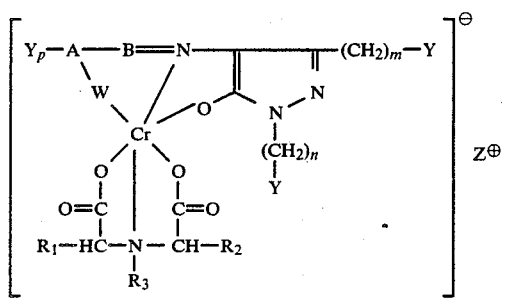

wherein $R_1$ and $R_2$ can be H or when taken together represent the carbon atoms necessary to complete, with the nitrogen atom, a five or six member heterocyclic moiety; and $R_3$ can be H or alkyl having from 1 to 6 carbon atoms.

FORMULA D

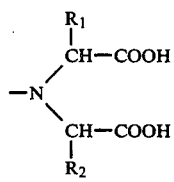

wherein X is the radical of an onium salt, for example, ammonium, sulfonium and phosphonium salts; each r is 0 or 1 provided that only one r is 1; and $R_4$ is H, alkyl having from 1 to 6 carbon atoms or $X_r$.

It will be apparent that where the onium salt and the silver halide developing substitutent(s) are integrated with the dye moiety each of them may be attached directly to the dye moiety or the onium salt may be attached to a developing substituent which in turn is attached to the dye moiety or the reverse thereof. All such structures are intended to be encompassed by Formula D.

The positive counterion, X, may be any onium salt, such as ammonium, sulfonium and phosphonium salts, which does not impair photographic processing, i.e., impair the absorption characteristics of the dye moiety or impair the functionality of the chrome complex as a dye developer or otherwise impair the formation of an image. A preferred class of onium salts which may be used is represented by the formula $$N^+R_5R_6R_7R_8$$

where $R_5$ is alkylene having from 2 to 8 carbon atoms and $R_6$, $R_7$ and $R_8$ can be H or alkyl, preferably having from 1 to 6 carbon atoms. Other onium salts include the ammonium or quaternary salts of heterocyclic bases, e.g., pyridinium or picolinium. It will be apparent to those skilled in the art that the onium salt is connected to the ligand or the dye moiety through one of the R groups.

The ligands illustrated in Formulas C and D are radicals of an iminodiacetic acid represented by the formula

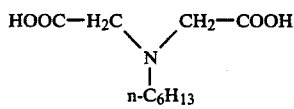

where $R_1$ and $R_2$ are as previously defined. A preferred ligand is a radical of an iminodiacetic acid represented by the formula

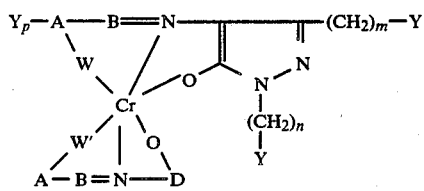

Two types of 2:1 chrome complexed dye developers according to the invention are represented by Formulas E and F.

FORMULA E

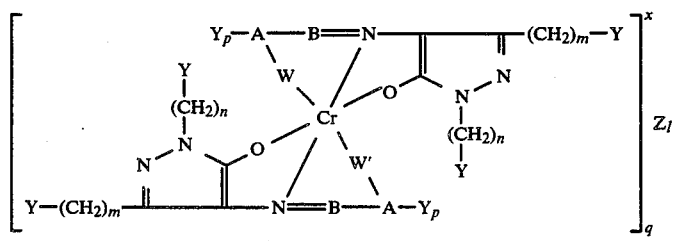

where W' is the same as or different than W and can be —O— or —COO and D is an aromatic radical such as a radical of benzene or naphthalene or a nitrogen-containing heterocyclic radical such as a radical of pyrazolone or pyrimidine.

FORMULA F

DESCRIPTION OF THE PREFERRED EMBODIMENTS

Specific dye developers according to the invention are represented by the following structural formulas:

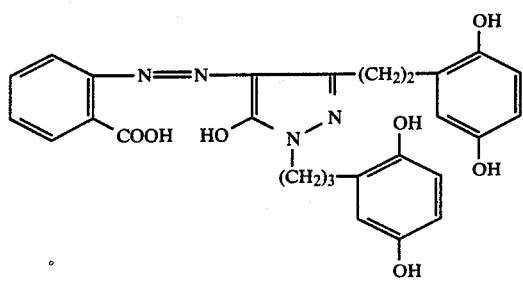
DYE I
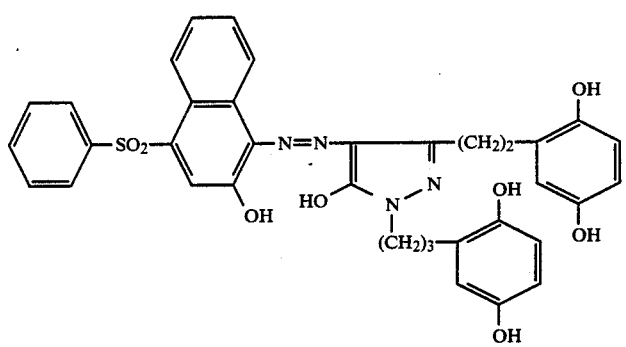
DYE II
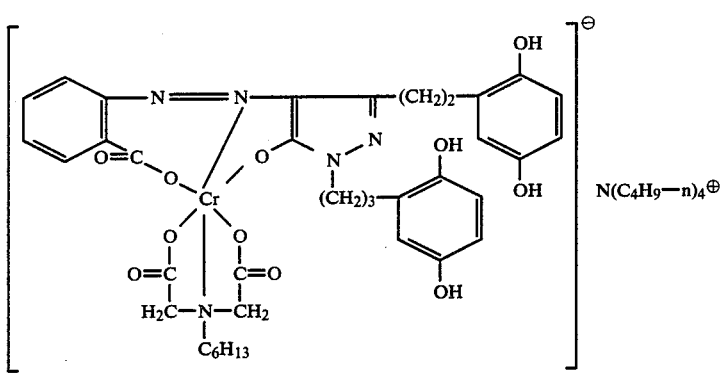
DYE III
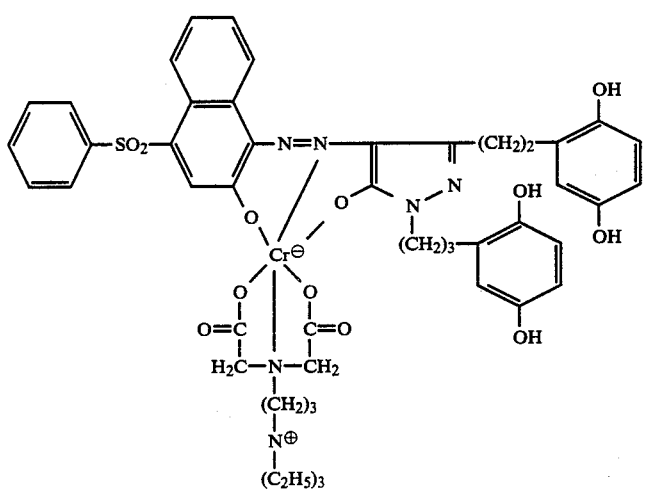
DYE IV

DYE V

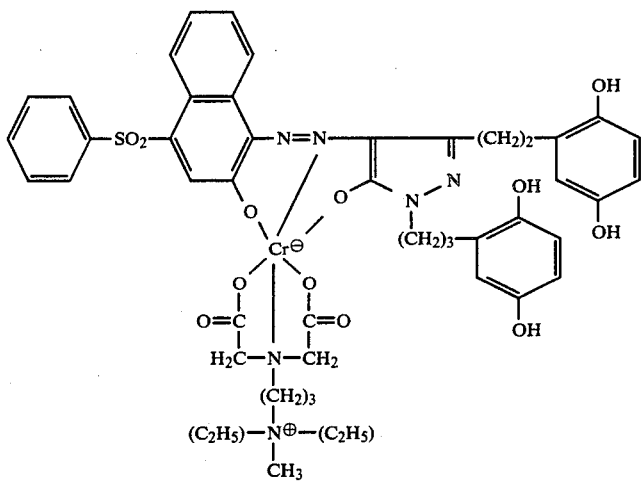

DYE VI

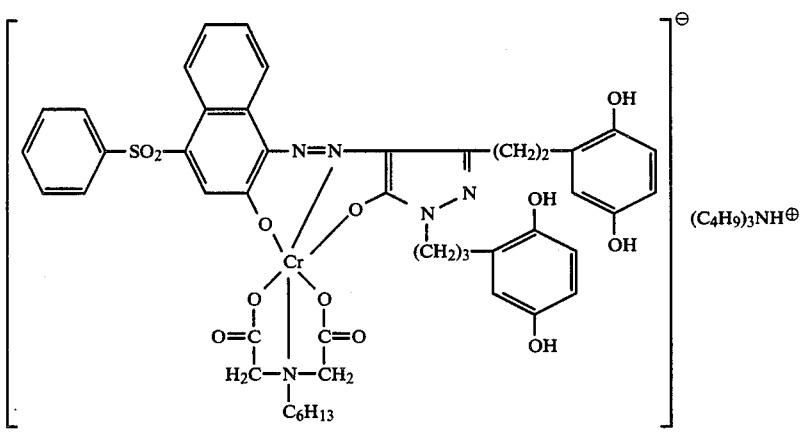

DYE VII

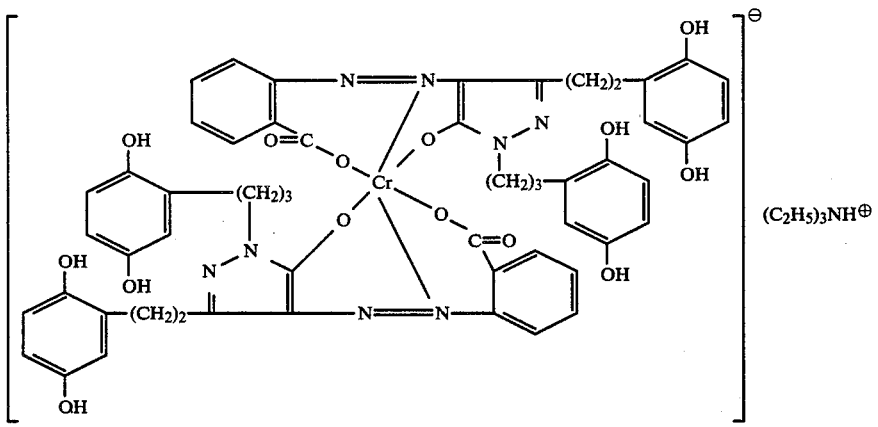

Dye VI and the blocked precursor of Dye II, and their preparation are disclosed in U.S. Pat. No. 4,267,253. Dyee IV and V and their preparation are disclosed in U.S. Pat. No. 4,267,252.

The dye developers of the invention can have different colors, for example, magenta or yello. These compounds can be prepared by techniques which are known in the art and various specific reaction seqquences will be illustrated in the Examples. Generally, the dye developers can be prepared by initially forming a pyrazole compound application Ser. No. 374,275, filed on even date herewith) and reacting that compound to form an azo or azomethine compound followed by chrome-complexing and attaching the ligand if appropriate for the particular compound.

As indicated previously in Formulas A–F, the dye moiety can have integrated therewith one or more silver halide developing groups in addition to the two silver halide developing groups which are incorporated in the pyrazolone moiety. Suitable silver halide developing groups for incorporation in these dye developers have been described previously. Details relating to such groups and techniques for integrating them in the dye moiety can be found in various patents including U.S. Pat. Nos. 3,086,005; 3,134,762; 3,141,772; 3,236,643;

3,235,645; 3,252,990 and 3 299,041. In some instances it may be desirable to employ a protected form of the silver halide developing group, i.e., where the hydroxy substituents are replaced by acyloxy, benzyloxy, alkoxy or acetoxy substituents.

The dye developers of the present invention may be utilized in any film unit which is useful in monochromatic or multicolor photography. These dye developers are particularly useful in diffusion transfer photographic products and processes which are well known in the art. Typical diffusion transfer photographic products and processes are described, for example, in U.S. Pat. Nos. 2,983,606; 3,345,163; 3,415,644; 3,573,043; 3,594,165; and 3,647,437. As described in U.S. Pat. No. 2,983,606 a photosensitive element containing a dye developer and a silver halide emulsion is photoexposed and a processing composition applied thereto, for example, by immersion, coating, spraying, flowing, etc., in the dark. The exposed photosensitive element is superposed prior to, during, or after the processing composition is applied, on a sheet-like support element which may be utilized as an image-receiving element. In a preferred embodiment, the processing composition is applied to the exposed photosensitive element in a substantially uniform layer as the photosensitive element is brought into superposed relationship with the image-receiving layer. The processing composition, positioned intermediate the photosensitive element and the image-receiving layer, permeates the emulsion to initiate development. The dye developer is immobilized in exposed areas as a consequence of the development. In unexposed and partially exposed areas of the emulsion, the dye developer is unreacted and diffusible and thus provides an imagewise distribution of unoxidized dye developer, diffusible in the processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed positive color image of the developed image. The image-receiving element may contain agents adapted to mordant or otherwise fix the diffused, unoxidized dye developer. In a preferred embodiment of said U.S. Pat. No. 2,983,606 and in certain commercial applications thereof, the desired positive image is revealed by separating the image-receiving layer from the photosensitive element at the end of a suitable imbibition period. Alternatively, as also disclosed in said U.S. Pat. No. 2,983,606, the image-receiving layer need not be separated from its superposed contact with the photosensitive element, subsequent to transfer image formation, if the support for the image-receiving layer, as well as any other layers intermediate said support and image-receiving layer, is transparent and a processing composition containing a substance, e.g. a white pigment, effective to mask the developed silver halide emulsion or emulsions is applied between the image-receiving layer and said silver halide emulsion or emulsions.

Multicolor images may be obtained using dye developers in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606 and in U.S. Pat. No. 3,345,163, wherein at least two selectively sensitized photosensitive strata, superposed on a single support, are processed, simultaneously and without separation, with a single common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion stratum, for example, in the form of particles, or it may be disposed in a stratum behind the appropriate silver halide emulsion strata. Each set of silver halide emulsion and associated dye developer strata may be separated from other sets by suitable interlayers, for example, by a layer or stratum of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be so employed and a separate yellow filter omitted.

Particularly useful products for obtaining multicolor dye developer images are disclosed in U.S. Pat. No. 3,415,644. This patent discloses photographic products wherein a photosensitive element and an image-receiving element are maintained in fixed relationship prior to exposure, and this relationship is maintained as a laminate after processing and image formation. In these products, the final image is viewed through a transparent (support) element against a light-reflecting, i.e., white background. Photoexposure is made through said transparent element and application of the processing composition provides a layer of light-reflecting material to provide a white background. The light-reflecting material (referred to in said patent as an "opacifying agent") is preferably titanium dioxide, and it also performs an opacifying function, i.e., it is effective to mask the developed silver halide emulsions so that the transfer image may be viewed without interference therefrom, and it also acts to protect the photoexposed silver halide emulsions from post-exposure fogging by light passing through said transparent layer if the photoexposed film unit is removed from the camera before image-formation is completed.

U.S. Pat. No. 3,647,437 is concerned with improvements in products and processes disclosed in said U.S. Pat. No. 3,415,644, and discloses the provision of light-absorbing materials to permit such processes to be performed, outside of the camera in which photoexposure is effected, under much more intense ambient light conditions. A light-absorbing material or reagent, preferably a pH-sensitive phthalein dye, is provided so positioned and/or constituted as not to interfere with photoexposure but so positioned between the photoexposed silver halide emulsions and the transparent support during processing after photoexposure as to absorb light which otherwise might fog the photoexposed emulsions. Furthermore, the light-absorbing material is so positioned and/or constituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13-14, but is substantially non-absorbing of visible light at a lower pH, e.g., less than 10-12. This pH reduction may be effected by an acid-reacting reagent appropriately positioned in the film unit, e.g., in a layer between the transparent support and the image-receiving layer.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion, and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

Other diffusion transfer products and processes in which the dye developers of the present invention may be utilized are described in U.S. Pat. Nos. 3,573,043 and 3,594,165. For convenience, the entire disclosure of each of the six patents referred to immediately above is hereby incorporated by reference herein.

A particularly useful film unit according to the invention is one wherein the photosensitive element includes a light-reflecting layer between the silver halide layer and the image dye-providing material layer (as described in Canadian Patent No. 668,592), the substrate of the photosensitive element carries the polymeric acid neutralizing layer which in turn carries the timing layer (as described in U.S. Pat. No. 3,573,043) and the processing composition includes an oximated polydiacetone acrylamide thickening agent (as described in U.S. Pat. No. 4,202,694).

The invention will now be described further in detail with respect to specific preferred embodiments by way of examples, it being understood that these are illustrative only and the invention is not limited to the materials, conditions, process parameters, etc., recited therein.

EXAMPLE I

PREPARATION OF DYE I

A. Preparation of a Pyrazole Intermediate

To a refluxing solution of 117 g of 95% $H_2NNH_2$ and 13.5 g of water in 400 ml of absolute ethanol there was added with stirring under nitrogen a solution of 90.45 g (0.18 mole) of a compound represented by the formula

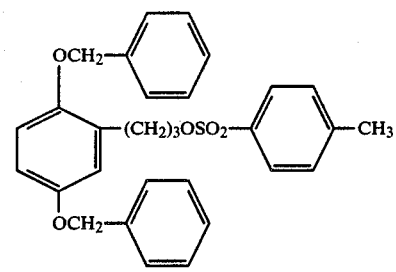

in 340 ml of diethyl ether and 400 ml of absolute ethanol over a period of 5½ hours. The solution was then refluxed for an additional half hour. The reaction mixture was evaporated under vacuum. Water was added to the residue and then extracted twice with ether. The ether extracts were washed twice with water, dried over anhydrous sodium sulfate and the sodium sulfate filtered off. To the ether filtrate there was added with stirring a solution of ether saturated with hydrogen chloride gas until no more precipitation occurred. The precipitate was recovered by filtration, washed with ether and dried to give 60 g of solid which was recrystallized from 450 ml of isopropanol to yield 52 g of a white solid represented by the formula

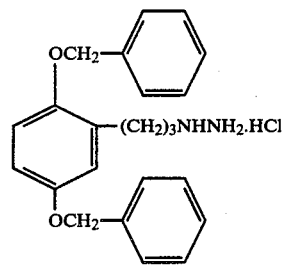

A mixture of 1 g (0.0023 mole) of this salt and 0.377 g (0.0046 mole) of sodium acetate in 30 ml of absolute ethanol was stirred at room temperature for several minutes. Then 1.1 g (0.00254 mole) of a compound represented by the formula

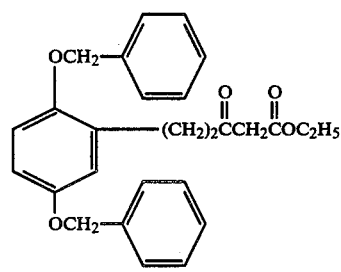

was added and the mixture stirred for 1½ hours. The solid which formed was collected by filtration, washed with ethanol and then with water and dried to give 1.35 g of a white solid, m.p. 93°-95° C., represented by the formula

COMPOUND I

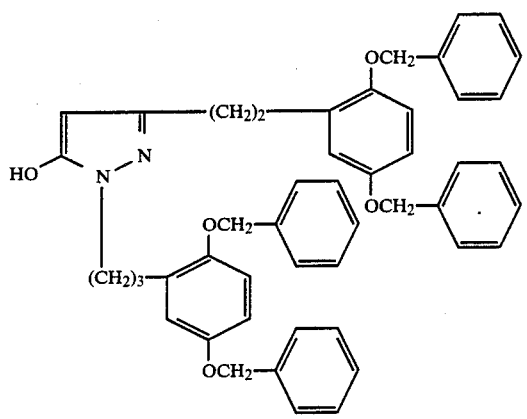

COMPOUND I

B. Preparation of Dye I

An acetic acid solution of the diazonium salt of anthranilic acid ($2.7 \times 20^{-2}$ mole in 60 ml) was added in portions to a stirred slurry of compound I (20 g, $2.7 \times 10^{-2}$ mole) and sodium acetate (10 g) in acetone (500 ml) at ambient temperature. The solution turned orange and over a period of time all of the starting material dissolved followed closely by a small amount of product precipitating from solution. The reaction mixture was stirred at room temperature for a ½ hour and 300 ml of water were added with stirring. The solid was collected by filtration, rinsed with water and recrystallized from methylene chloride and isopropyl alcohol to give 20 g of the benzyloxy-blocked precursor of Dye I.

Hydrogen bromide was bubbled through a stirred solution of 20 g of the blocked precursor in 200 ml of dimethoxyethane and methylene chloride for three hours. After standing for 12 hours, 500 ml of water were added to the reaction mixture and the solid collected by filtration and dried to give 10 g (83% yield) of Dye I.

EXAMPLE II

Preparation of Dye II

To a mixture of 36.5 g (0.05 mole) of compound I and 15.5 g (0.05 mole) of a compound represented by the formula

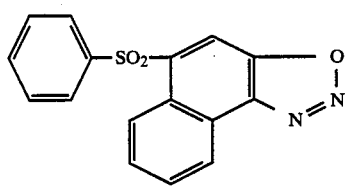

in 500 ml of acetone there was added with stirring a solution of 8.4 g (0.1 mole) of sodium hydrogen carbonate in 250 ml of water. The mixture was stirred at room temperature for two hours, poured into 125 ml of concentrated hydrochloric acid and ice, filtered, washed well with water and dried to provide 48.7 g of the blocked precursor of Dye II.

A solution of 46 g (0.0442 mole) of the blocked precursor of Dye II in 400 ml of methylene chloride was added over a period of two hours, dropwise and with stirring, to a solution of 88.85 g of boron tribromide in 800 ml of methylene chloride cooled to $-78°$ C. and under nitrogen. The solution was stirred for an additional half hour at $-78°$ C. Ether was added twice and by warming to room temperature, evaporated to dryness with nitrogen. The residue was triturated with ether, filtered, washed with ether and dried. It was then dissolved in warm methanol and evaporated under vacuum to yield 30 g of Dye II.

EXAMPLE III

Preparation of Dye III

A solution of chromium chloride hexahydrate (3.08 g, $1.16 \times 10^{-2}$ mole) in 50 ml of methyl cellosolve was purged with nitrogen for 20 minutes. Dye I (2.0 g, $3.86 \times 10^{-3}$ mole) was added to the solution and it was heated to reflux for two hours. The cooled reaction mixture was evaporated to dryness and saline solution was added to the residue. The mixture was scratched and the resulting solid collected by filtration to yield 1:1 chrome complex.

A mixture of 1.0 g ($1.5 \times 10^{-3}$ mole) of the chrome-complex, 0.66 g ($3 \times 10^{-3}$ mole) of N-hexyliminodiacetic acid and 0.6 g ($6 \times 10^{-3}$ mole) of triethylamine in methyl cellosolve was prepared under nitrogen and warmed on a steam cone for 20 minutes. To this mixture there was added a solution of tetrabutyl ammonium chloride in water (approximately 100 mg in 100 ml). The resulting solid was collected, rinsed well with water and ether and dried to give Dye III, $\lambda$max (meth.cell.)=440 nm, $\epsilon$=9,900.

$C_{50}H_{78}O_7N_6Cr \cdot 3H_2O$ requires 58.94% C, 7.69% H, 7.78% N and 4.82% Cr. Elemental analysis of Dye III found 59.15% C, 7.5% H, 8.2% N and 5.42% Cr.

EXAMPLE IV

Preparation of Dye VII

A mixture of 10 g ($1.9 \times 10^{-2}$ mole) of Dye I, 4.94 g ($2 \times 10^{-2}$ mole) of chromium triacetate monohydrate and 2.0 g ($2 \times 10^{-2}$ mole) of triethylamine in 100 ml of dimethylformamide was heated to 110° C. for two hours. The cooled solution was added to 1 liter of water with stirring. The brown solid was collected by filtration and dried under vacuum to give 10 g of Dye VII $\lambda$max (meth.cell.)=440 nm, $\epsilon$=20,400.

EXAMPLE V

A film unit was prepared as follows: the negative was made by coating a subcoated 4 mil polyethylene terephthalate film base with the following layers.

1. a layer of compound V dispersed in cellulose acetate hydrogen phthalate at a coverage of about 52.6 mgs/ft² (0.0512 m moles) of compound V and 52.6 mgs/ft² of cellulose acetate hydrogen phthalate;
2. a green sensitive gelatino silver iodobromo emulsion coated at a coverage of about 120 mgs/ft² of silver and about 120 mgs/ft² of gelatin;
3. a layer coated at a coverage of about 30 mgs/ft² of gelatin and about 7.5 mgs/ft² of 4'-methyl phenyl hydroquinone.

The image-receiving element comprised a 4 mil polyethylene terephthalate film base with the following layers coated thereon in succession:

1. as a polymeric acid layer, a partial butyl ester of polyethylene/maleic anhydride copolymer at a coverage of about 2,450 mgs/ft²;

2. a timing layer containing about a 75:1 ratio of a 60-30-4-6 copolymer of butylacrylate, diacetone acrylamide, styrene and methacrylic acid and polyvinyl alcohol at a coverage of about 350 mgs/ft²;

3. A polymeric image receiving layer containing a 3:1 blend of a mixture of 1 part poly-4-vinylpyridine and 2 parts polyvinyl alcohol and a 2.2:2.2:1 graft copolymer of hydroxyethylcellulose, 4-vinylpyridine and vinyl benzyl trimethyl ammonium chloride coated at a coverage of about 300 mgs/ft.

The film unit was processed with a processing composition comprised of:

|  | (GMS/100 gm H₂O) |
|---|---|
| Titanium dioxide | 94.08 |
| Sodium carboxymethyl cellulose | 2.29 |
| Potassium hydroxide | 9.42 |
| Lithium hydroxide | 0.26 |
| N—benzyl-α-picolinium bromide | 2.81 |
| N—phenethyl-α-picolinium bromide | 1.62 |
| Benzotriazole | 1.25 |
| 5-methyl-6-bromo-azabenzimidazole | 0.06 |
| 6-methyl uracil | 0.66 |
| Lithium nitrate | 0.22 |
| Ethylene diamine tetraacetic acid | 1.86 |
| Colloidal silica | 1.23 |
| Carbowax | 1.23 |
| Bis-2-aminoethyl sulfide | 0.05 |
| N—benzylamino purine | 0.89 |

The film unit was exposed to green and blue light and then passed through a pair of rollers at a gap of about 0.0020 inches. The unit was allowed to remain in the dark for 10 minutes and the maximum and minimum reflection densities were then measured. The resulting image had a $D_{max}/D_{min}=1.95/0.80$ and the ratio of the minimum density in the blue region to the maximum density in the green region was 0.32.

Although the invention has been described in detail with respect to various embodiments thereof, it should be understood that these are intended to be illustrative only and not limiting of the invention but rather those skilled in the art will recognize that modifications and variations may be made therein which are within the spirit of the invention and the scope of the appended claims.

What is claimed is:

1. A photographic film unit which comprises a support carrying a photosensitive silver halide emulsion layer associated with a dye developer which is represented by the formula

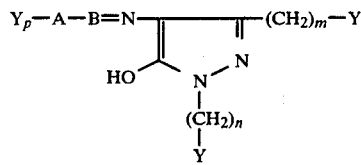

wherein A is a radical of benzene or naphthalene; B is —N— or —CH; Y is a silver halide developing substituent; m and n are the same or different and each is an integer of from 1 to 6; and p is 0, 1 or 2.

2. A film unit as defined in claim 1 wherein said dye developer is represented by the formula

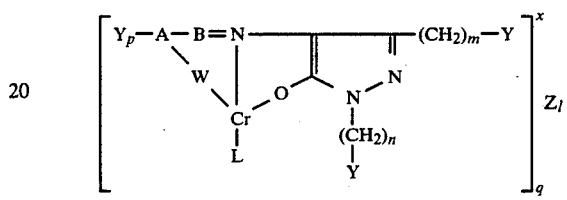

wherein W is —O— or —COO; L is a molecular or molecules which satisfy the coordination sphere of chromium; x is a positive or negative charge or zero; Z is an anion or a cation; q is equal to the absolute value of the charge on Z; and l is 0 or 1.

3. A film unit as defined in claim 2 wherein said dye developer is represented by the formula

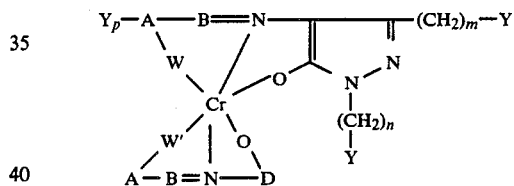

wherein W' is the same or different than W and is —O— or —COO; and D is a radical of benzene, naphthalene, pyrazolone or pyrimidine.

4. A film unit as defined in claim 2 wherein said dye developer is represented by the formula

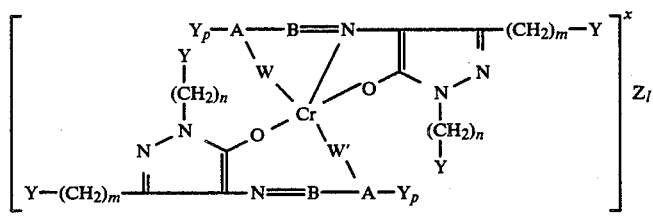

wherein W' is —O— or —COO.

5. A diffusion transfer film unit comprising a first support and a second support, at least one of said supports being transparent; a plurality of layers including at least one photosensitive silver halide emulsion layer associated with a dye developer layer carried on one of said supports; an image receiving layer carried on one of said supports; a rupturable container releasably holding a processing composition adapted, when distributed between a pair of predetermined layers carried by said supports, to develop said photosensitive silver halide emulsion layers and provide a diffusion transfer image in said image receiving layer, means providing a white light-reflecting layer between said image-receiving layer and said silver halide emulsion layer(s) to mask said silver halide emulsion layer(s) after development thereof and to provide a white background for a diffusion transfer image formed in said image receiving layer, said diffusion transfer image being viewable through said transparent support; said supports and the layers carried thereon being held in fixed relationship with said photosensitive silver halide emulsion layer(s) being photoexposable through said transparent support, one of said dye developer layer(s) comprising a dye developer which is represented by the formula

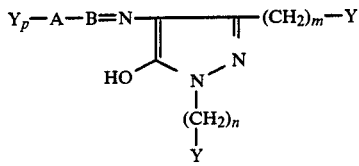

wherein A is a radical of benzene or naphthalene; B is —N— or —CH; Y is a silver halide developing substituent; m and n are the same or different and each is an integer of from 1 to 6; and p is 0, 1 or 2.

6. A film unit as defined in claim 5 wherein said image receiving layer is carried by said transparent support, said processing composition includes a white pigment and said rupturable container is so positioned as to distribute its contents between one of said silver halide emulsion layer(s) and the transparent support through which photoexposure is effected.

7. A film unit as defined in claim 5 wherein both said supports are transparent, said image receiving layer and said silver halide emulsion layer(s) are carried by the same support with a layer of white pigment therebetween, and said rupturable container is so positioned as to distribute its contents between one of said silver halide emulsion layer(s) and the transparent support through which photoexposure is effected.

8. A film unit as defined in claim 5 wherein said dye developer is represented by the formula

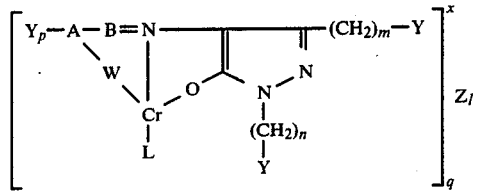

wherein W is —O— or —COO; L is a molecule or molecules which satisfy the coordination sphere of chromium; x is a positive or negative charge or zero; Z is an anion or a cation; q is equal to the absolute value of the charge on Z; and l is 0 or 1.

9. A film unit as defined in claim 8 wherein said dye developer is represented by the formula

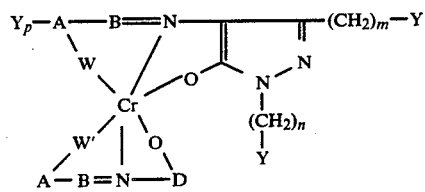

wherein W' is the same or different than W and is —O— or —COO; and D is a radical of benzene, napthalene, pyrazolone or pyrimidine.

10. A film unit as defined in claim 8 wherein said dye developer is represented by the formula

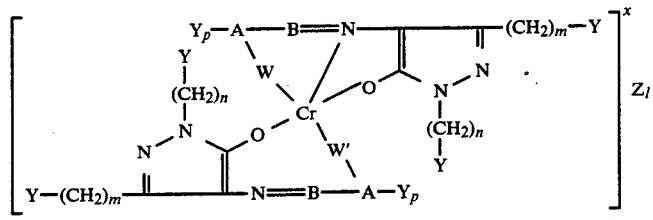

wherein W' is —O— or —COO.

* * * * *